(12) United States Patent
Katsuki et al.

(10) Patent No.: US 7,664,402 B2
(45) Date of Patent: Feb. 16, 2010

(54) INFORMATION COMMUNICATION SYSTEM FOR USE IN ROBOT

(75) Inventors: Rie Katsuki, Kawasaki (JP); Takashi Yoshimi, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 505 days.

(21) Appl. No.: 11/686,718

(22) Filed: Mar. 15, 2007

(65) Prior Publication Data
US 2008/0013958 A1  Jan. 17, 2008

(30) Foreign Application Priority Data
Mar. 30, 2006 (JP) .............................. 2006-094359

(51) Int. Cl.
*H04B 10/00* (2006.01)
(52) U.S. Cl. .................. 398/140; 398/109; 398/114
(58) Field of Classification Search ............... 398/109, 398/114, 140
See application file for complete search history.

(56) References Cited

U.S. PATENT DOCUMENTS 5,367,458 A * 11/1994 Roberts et al. ................ 701/25
6,058,339 A * 5/2000 Takiguchi et al. ............. 701/28

FOREIGN PATENT DOCUMENTS

JP  2005-094744  4/2005

* cited by examiner

*Primary Examiner*—Shi K Li
(74) *Attorney, Agent, or Firm*—Turocy & Watson, LLP (57) ABSTRACT

An information communication system for use in a robot communicates a full-color light flux between a transmitting device and a receiving device separated from each other. The transmitting device receives a sensor signal to generate an optical information signal including a color signal based on a sensor identifying information and a brightness signal based on an output level of the sensor signal, and irradiates a light flux (an optical signal) enabling a user to recognize it through the optical information signal from a color LED. The receiving device is arranged away from the transmitting device, in which an analysis unit generates an identifying signal and an output level of a sensor on the basis of color information and brightness information extracted from an image processor from image data including the optical information signal imaged by an imaging unit.

12 Claims, 5 Drawing Sheets

INFORMATION COMMUNICATION SYSTEM FOR USE IN ROBOT

CROSS-REFERENCE TO RELATED APPLICATIONS

This application is based upon and claims the benefit of priority from prior Japanese Patent Application No. 2006-094359, filed Mar. 30, 2006, the entire contents of which are incorporated herein by reference.

BACKGROUND OF THE INVENTION

1. Field of the Invention

The present invention relates an information communication system for use in a robot converting an information signal into an optical signal to enable communication between constituent parts of the robot.

2. Description of the Related Art

Conventionally, in manufacturing industries on down, manufacturing assembly and checking automated by industrial robots have progressed. In recent years, even in a business field dependent on human actions and human services up to this day, robotization which is conducted by an assistance robot, performing nursing help and assistance for human work and having different uses in comparison to the industrial robot, has been expected to be put into practice.

It is required for such a robot to mount a variety of sensors and acquire information relating to operations to control it for performing accurate operations. For example, for a robot operating in a house, office or public institute, namely, for a "robot coexistent with human being", it becomes important not only to perform a mere mechanical operation but also to allow a user (side receiving service or operator) to intuitively recognize an operation condition of the robot visually and audibly. For instance, in work by which the user transfers articles to the robot, after transferring the articles manually to the gripping part of the robot, the user has to quickly recognize whether or not the robot surely grasps the articles when the user takes off the articles.

To transfer the articles from the gripping part of the robot, the robot needs a plurality of sensors, in response to each operation, for instance, sensors to operate the gripping part depending on the firmness and shape so as not to break the articles in gripping them. The sensors monitor the start and end of the operation, and a presentation mechanism is also required to notify the monitored condition to the user.

A large number of signal lines are provided to transmit sensor signals output form the sensors to a control unit and an interface, respectively. For example, if the gripping part is disposed at a tip of an arm having a joint, the signal lines are wired in order to be laid along with the inside and outside of the arm.

The case of the laying of the large number of signal lines makes the arm thick and requires that the arm becomes so strong to bear the increase in weight due to the signal lines. If it is structured that the arm has a joint to be bent or expanded, an arm operation, breaking prevention and the like have been taking into account, drawing the wiring of the signal lines becomes hard and its structure becomes complicated.

To solve such a problem, JP-A 2005-94744 (KOKAI) presents a control system planning to save lines by reducing the number of the signal lines connecting the main control device of the robot and each set of equipment.

This JP-A 2005-94744 (KOKAI) discloses a technique dividing a frequency band of a signal propagated on a single signal line into a plurality and assigns frequency bands different from one another to a plurality of sets of equipment to be connected to the signal lines. According to the technique, signals different in frequency band having been input to each set of the equipment, respectively, the control system can independently control each set of the equipment. To conduct such independent control, the robot needs many sensors to dispose at each constituent part. The robot has to draw the wiring connecting the sensors to the control unit (sensor signal processor).

In the aforementioned technique, dividing the frequency band of the signal on the single signal line into the plurality results in reducing the number of the signal lines; however, not a few number of the signal lines remain yet. Therefore, providing the sensors at the constituent parts disposed at the tip of the arm with a multiple-joint poses a problem on the technique in drawing the wiring in the same manner as the case before. Accordingly, the larger the number of the joints becomes, the heavier a load is put on the wiring for each drive, and the problem on disconnections or the like has to be taken into account. If the constituent parts having different functions for the arm are structured to be displaceable by detaching, connectors and the like should be disposed halfway the signal lines, and the problem on the attenuation of the sensor signals are produced.

Further, communications among the constituent parts with radio equipment not requiring signal lines mounted are possible approach. However, in the case of intending to make a large number of radio communications within a limited region, there is the possibility that accurate communications are not made because of crosstalk, interference or overlapping of high-frequencies depending on a circumstance and a situation in the use places, and the desired number of robots cannot be operated simultaneously sometimes. If the robots are those for the nursing help, moving places including medical institutes such as hospitals, in the case in which the robots become generation sources of electromagnetic waves, the control system has to make the robots not affect on medical equipment.

BRIEF SUMMARY OF THE INVENTION

According to embodiments of the invention provides an information communication system transmitting/receiving a sensor signal from a sensor disposed at a robot, communicating by eliminating a restriction due to drawing of wiring and a radio communication without using the wiring and the radio communication for transmitting and receiving, and presenting an operation condition to a user.

Further, the embodiment of the invention provides an information communication system for use in a robot which has a movable portion, comprising a transmitting device and a receiving device: the transmitting device including: at least one sensor movable with the movable portion, which generates a sensor signal; a signal processing unit which convert the sensor signal to brightness information which corresponds to an output level of the sensor signal, and color information used for identifying the sensor; and a light emitting unit which emits an optical signal having the color information and the brightness information, respectively, and a reference optical signal, the receiving device including: an imaging unit which images the optical signal and the reference optical signal emitted by the transmitting device; an image processing unit which extracts the color signal and the brightness signal from image data generated by the imaging unit; and an analyzing unit which analyzes the color signal and the brightness signal to output an information for identifying the sensor and the output level of the sensor signal.

DETAILED DESCRIPTION OF THE INVENTION

Embodiments of the present invention will be described in detail with reference to the drawings hereinafter.

Figure 1:
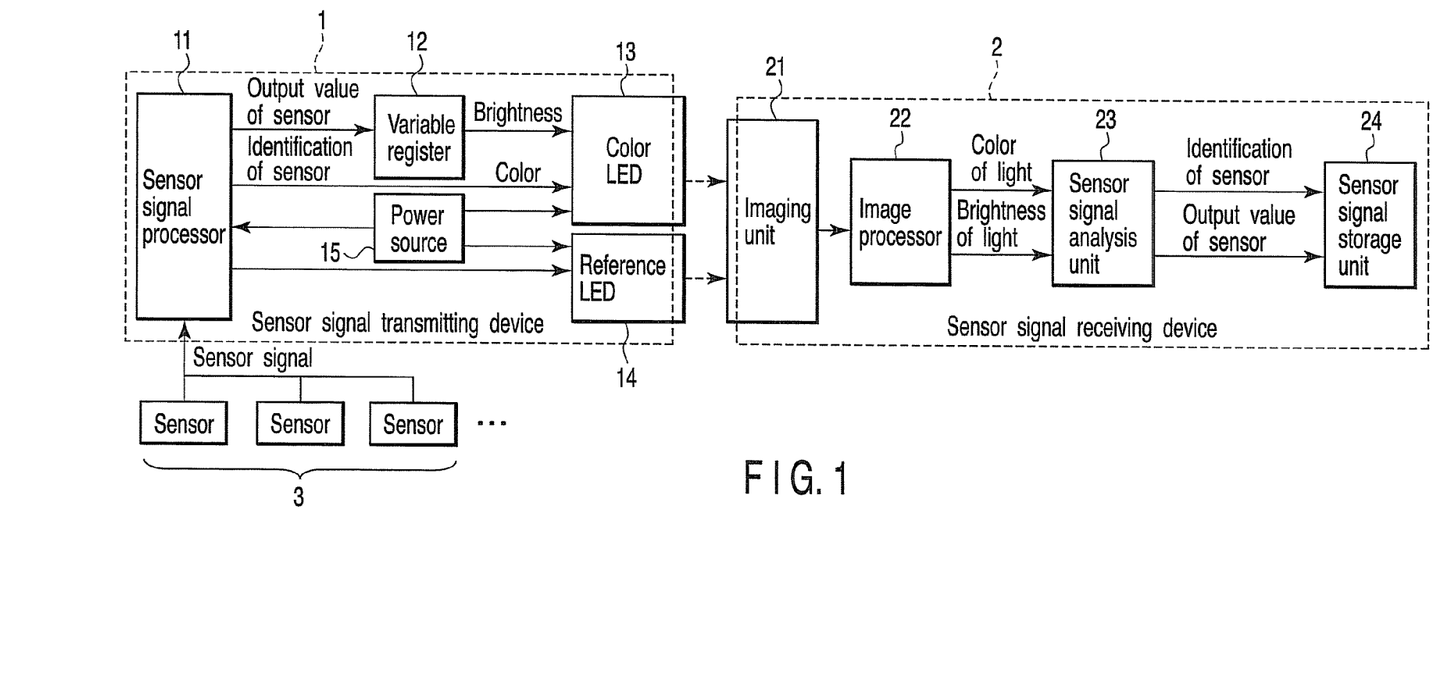
FIG. 1 is an exemplary view depicting a configuration example of an information communication system for use in a robot regarding a first embodiment.

FIG. 1 shows a configuration example of an information communication system for use in a robot regarding a first embodiment of the present invention.

The communication system is mounted on a robot and performs optical communications. Roughly speaking, it has a sensor signal transmitting device 1 disposed at a movable part to perform work, etc., and a sensor signal receiving device 2 disposed inside a robot main body to fix the movable part. The transmitting device 1 is connected to at least more than one sensor 3 disposed at the movable part of the robot through signal lines.

The transmitting device 1 comprises a sensor signal processor 11 converting the sensor signals output from the sensors 3 into below-mentioned an optical information signal; a full color light emitting diode (hereinafter, referred to as color LED) 13 irradiating, the optical information signal as a light flux (an optical signal), namely, emitting light; a variable register 12 matching a sensor output level output from the signal processor 11 with a dynamic range of the color LED 13; a reference LED 14 irradiating the light flex to be a reference of the information signal; and a power source 15 supplying drive power to the constituent parts.

The color LED 13 irradiates light flux of colored (single color or composite color made of a plurality of colors) light or colorless (transparent color) light flux by emitting light, the reference LED 14 irradiates a light flux with prescribed colors and brightness levels to be references, and the LEDs 13 and 14 have a light emitting unit. The signal processor 11 generates sensor identifying signals identifying the output sensors 3 have made outputs on the basis of the sensor signals received from the sensors 3, and generates an optical information signal (a sensor identifying signal as a color signal or color information, and a sensor output signal as a brightness signal and brightness information) to be transmitted to the color LED 13 on the basis of the output levels of the sensor identifying signals and the sensor signals. In this case, the optical information signal have the color signal indicating the sensor identifying signal and the brightness signal indicating the sensor output level. Of course, for the optical information signal, even an information signal other than the sensor identifying signal and the sensor output level can be treated in the same manner. The present embodiment having described a state the LEDs 13 and 14 continuously emitting light or a state emitting no light yet as the example, intermittent (pulse interval) emitting light from the color LED 13 to vary the number of pulses (the number of light emitting per unit time) and the intervals of each pulse can increase an information quantity. For example, defining with combinations of long and short signals like Morse codes enables an increase in information quantity to the light flux to be transmitted.

The color LED 13 is a general type of full color LED configured to emit at least three colors (red as R, green as G, and blue as B) individually or at a time. For an information communication system appropriately constituted for a robot, a high-brightness LED is also usable for an LED.

In the embodiment, the sensor identification-enabled number (the number of sensors) possible to express with the light flux to be transmitted becomes the same as that of colors possible to be expressed by the color LED 13. That is, if LEDs with three colors are used and they simply emit light individually, the number of sensors becomes three of the number of sensors. In contrast, if light is emitted with a plurality of sensors combined, light flux of colors with the emitted light colors mixed therein is irradiated. For example, when the communication system emits the light with three pieces of the sensors 3 combined, the communication system can identify 7 sensors ($7=2^3-1$) from the combination of (light emission)/(non-light emission) of each of the three colors. The reason for subtracting 1 from $2^3$ is the possibility of the state where none of the three colors is emitted.

Moreover, the reference LED 14 is used to solve problems occur in color recognition and brightness recognition of the light flux irradiated from the color LED 13 resulting from the difference in illumination environment, for instance, in an optical environment of surrounding of an operating robot, such as an environment under fluorescent lamp illumination or under incandescent lamp illumination. The reference LED 14 is disposed near by the color LED 13. The below-mentioned image processor 22 calculates relative level between the light flux from the two of the color and reference LEDs 13 and 14 to conduct a correction process with the relative level to the light flux irradiated form the color LED 13. The kind of the light flux irradiated from the reference LED 14 are set to light flux in white having fixed brightness and are set to light flux having the fixed brightness and having the same colors as those of the light flux irradiated from the color LED 13. Variable ranges of a dynamic range and pitch to the display-enabled output level from the sensor 3 depend on the performance of the variable register 12. The variations of the output level from the sensor 3 are not limited to the resister element of the variable register 12, and it is enough to be a changeable current level, for instance, a variable impedance circuit, etc., are usable.

Next to this, the sensor signal receiving device 2 will be set forth.

The receiving device 2 includes a solid imaging element (image sensor) such as a CCD, and has an imaging unit 21 receiving the light flux form the sensors 3 to generate image data through photoelectric conversion; an image processor 22 extracting color information (color signal) and brightness information (brightness signal) of the color LED 13 from the image data; a sensor signal analysis unit 23 analyzing to output the identifying signals and output levels (sensor quantities) of the sensors 3 from the color information and the brightness information; and a sensor signal storage unit 24 storing by associating the analyzed and output identifying signals of the sensors 3 and the output levels of the sensors 3 with a preset storage area (table, file, etc.).

In such a configuration, the light emitting unit having the color LED 13 and the reference LED 14 is preferable to face an imaging face of the imaging unit 21 linearly and without any shielding object. However, if the light flux irradiated though a member, not shielding the light flux, such as an optical lens system or a fiber cable reaches the imaging face, interposing the shielding object occurs no problem.

In the receiving device 2 configured like this, the imaging unit firstly images the light flux simultaneously or individually irradiated from the color LED 13 and the reference LED 14 to generate the image data. The image processor 22 calculates the relative level at the color and reference LEDs 13 and 14 from the image data to store it in a memory in the image processor 22. Next, the color LED 13 emits light by the optical information signal generated on the basis of the sensor signals form the sensors 3, and the imaging unit 21 images the irradiated light flux to generate the image data including the optical information signal. The image processor 22 then takes in the generated image data therein. The image processor 22 performs the correction process by means of the stored relative level. The optical information signal is extracted from the correction-processed image data, and the color information (color signals) separated to each color and the brightness information (brightness signals) for each color is acquired. The sensor signal analysis unit 23 converts the color signal and the brightness signal into identifying information and output levels of a plurality of sensors 3. The acquired sensor identifying information and the output levels are stored in a sensor signal storage unit 24. The identifying information and output levels of the sensors 3 are appropriately read out by a not shown robot control unit to be used by drive control (feedback control) of the movable unit with the sensors 3 mounted thereat.

Figure 2:
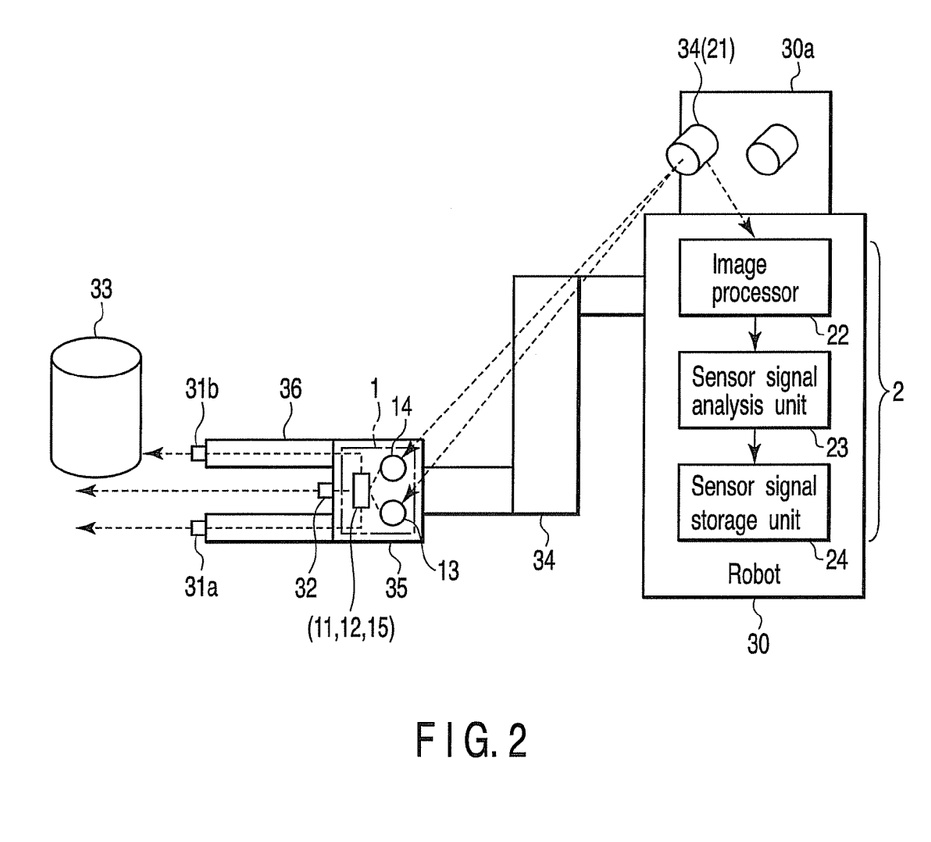
FIG. 2 is an exemplary view depicting an example in which the information communication system of the first embodiment is mounted on a robot having a distance sensor.

FIG. 2 depicts an example in which the information communication system of the first embodiment is mounted on the robot.

The communication system of the embodiment is utilized for a sensor for measuring an article distance at a robot 30. The robot 30 is structured as a robot having a manipulator and provided with an arm 34 the front edge side of which is movable three-dimensionally. The arm 34 the base edge side of which is attached and fixed to a robot body side, and a hand unit 35 capable of gripping articles 33 is attached to the front end side of the arm 34. The hand unit 35 is provided with a gripping unit 36 having at least two bars corresponding to fingers. Distance sensors 31a and 31b are provided with at the tip of the gripping unit 36 and at least one distance sensor 32 is provided with a bar base part of the hand unit 35 corresponding to a palm. When gripping the articles 33, the distance sensors 31a, 31b and 32 measure the distance between the articles 33 and the hand unit 35, and the robot control unit (not shown) grasps the gripping state of the hand unit 35 on the basis of the measurement signal to control the gripping operation. The robot 30 is configured to enable gripping similarly with the use of the hand unit 35 by grasping the gripping state of articles even if they are mounted on a platform, etc., or even if they are mounted on a moving body, for example, on a belt conveyer to be in a moving state.

The transmitting device 1 in the communication system of the present embodiment is mounded on the hand unit 35 and the receiving unit 2 is mounted on the robot body side.

Among of them, in the transmitting device 1, the signal processor 11, the variable register 12 and the power source 15 are mounted in the hand unit 35. The constituent parts are mounted individually or as an integrated unit. The signal processor 11 is connected to the sensors 3 including the distance sensors 31a, 31b and 32 through the wiring. The light emitting parts of the color LED 13 and the reference LED 14 are disposed at the exterior of the hand unit 35 so that the emitted light flux are irradiated outside.

A head unit 30a is rotatably attached on an upper side of the body of the robot 30. The head unit 30a has an imaging unit 34 having an imaging element has a CCD, etc., functioning as eyes by attaching it to a not shown moving mechanism to move the imaging eyesight (field angle) of the imaging unit 34 up and down. The communication system may share the imaging unit 34 with the imaging unit 21 of the foregoing sensor signal receiving device 2. The image processor 22, the sensor signal analysis unit 23 and the sensor signal storage unit 24 in the receiving device 2 are mounted inside the body of the robot 30. The constituent parts of the communication system may be provided individually from the constituent parts to constitute the robot 30, and also may share the function at the parts can be used in dual purpose. For instance, the imaging unit 34 functioning as the eyes of the robot 30 may be shared with the imaging unit 21, and further, the image processor 22 may be shared with a not shown robot image processor to conduct an image process of the imaging unit 34. The spots and the number of the sensors 3 mounted on the robot 30 being different in response to objects to be detected, the configuration of the communication system may be appropriately designed.

In such an information communication system, communications made in accordance with the operations of the robot 30 will be described.

The communication system performs calibration of an optical signal beforehand. The signal processor 11 generates the brightness signals having levels to be reference and the preset color signals to make the color LED 13 and the reference LED 14 emit light, respectively. The imaging unit 21 images the light flux irradiated from each LED 13 and 14, generates the image data to calculate the relative level, and stores them. If other initializing work is needed, the communication system properly conducts it.

In operating, the communication system gives an instruction to the robot 30 so as to grip the articles 33 from a user, etc., located in the vicinity thereof. On receiving the instruction, the head unit 30a of the robot 30 is firstly set in order to turn to the hand unit 35 and to make the moving mechanism site the color LED 13 and the reference LED 14 at the center in the imaging area of the imaging unit 21 (imaging unit 34) as much as possible.

After making the hand unit 35 approximate the articles 33 in a certain degree of a distance (within a measurement-enabled range of distance sensor), the robot 30 performs measurement by means of the distance sensors 31a, 31b, and 32 disposed at the hand unit 35. The distance sensors 31a, 31b and 32 transmit the distance signals (distance information) that are the measurement results to the sensor signal processor 11, respectively, as the sensor signals.

The signal processor 11 generates the identifying signals identifying the distance sensors 31a, 31b and 32 which have output the distance signals in order to make accompany them to the received distance signals. Successively, the signal processor 11 converts the identifying signals into the color signals for the color LED 13, converts them into the brightness signals having the output levels in response to the sizes of the distance signals to generate the optical information signal, and outputs them to the color LED 13. However, on the way, the signal processor 11 passes the brightness signals through the variable register 12 to adjust them so as to match with the dynamic range of the color LED 13 and outputs them to the color LED 13. In the color LED 13, the LED with the color specified by the color signals emits light in luminous intensity (brightness) corresponding to the levels of the brightness signals to irradiate the light flux outside.

In the configurations, for instance, it is presumed that the distance sensor 31*b* is associated with the color LED 13 of red light. The distance sensor 31*b* varies the level (output level from sensor signal) of the distance signal in response to the measured distance between the approaching gripping unit 36 and the articles 33. The change in the distance signal makes the color LED 13 emit red light in which its brightness has varied step by step or linearly. Measuring by using more than two distance sensors outputs the distance signals measured by each distance sensor, respectively. Brightness levels depending on the sizes of the distance signals are obtained, respectively. The colors emitted from respective LEDs of the color LED 13 are associated with the sensors. Accordingly, the LEDs of the colors associated by each sensor simultaneously emit light having each brightness level and irradiate outside so as to mix (add) the light flux of each color.

Next, the imaging unit 21 of the receiving device 2 images the light flux irradiated from the color LED 13 to generate the image data including the distance information, etc. The generated image data is loaded in the image processor 22 to be conducted the correction process according to the stored relative level. The color signals separated to each color and the brightness signals for each color are obtained from the correction-processed image data. The sensor signal analysis unit 23 converts the color signals and the brightness signals into the identifying information of the sensors and the distance signals by the sensors to be stored once in the sensor signal storage unit 24.

The not shown robot control unit of the robot 30 reads out the identifying information and the distance signal of the distance sensor 31*b* from the storage unit 24 and transmits the control signal to not shown gripping unit drive unit so that the gripping unit 36 with the distance sensor 31*b* provided therewith operates in response to the distance signals (distance information).

Even if the communication system has a configuration in which the robot is separated, the system also can make communications without having to wire. Mounting each communication system on each robot can communicate among the robots with one another and simultaneously execute one thing, and also can establish master-slave relationships among the robots, if there is no shielding object among the robots and they are located at close distances.

As mentioned above, the communication system in the first embodiment having separated the sensor signal transmitting device and the sensor signal receiving device from each other, and having transmitted and received the information through the optical communications, there is no need to provide wiring among devices, and does not occur any failure due to disconnection of the wiring. Having omitted the drawing of the wiring to the constituent parts such as the arm connecting between the transmitting device and the receiving device, the arm makes the joint structure easy and achieves reduced weight and reduced diameter.

Further, because the communication system performs the optical communications, the communication system eases restrictions on a place and a situation where it is used, in comparison to a radio communication. For instance, even if the place is in a medical institute, the communication system does not affect evil effects on medical equipment. Even if the communication system operated within a limited area, it not having assigned any radio frequency band and no having caused any cross talk, etc., the number of the robots allowing being operated simultaneously is not restricted and the desired number of the robots can be operated. Even when the robots are operated at a home, they are not affected by appliances generating high frequencies, such as a microwave oven, accurate communications are implemented, and the robots are normally operated in accordance with instructions.

Next to this, a second embodiment of the present invention will be described.

Figure 3A:
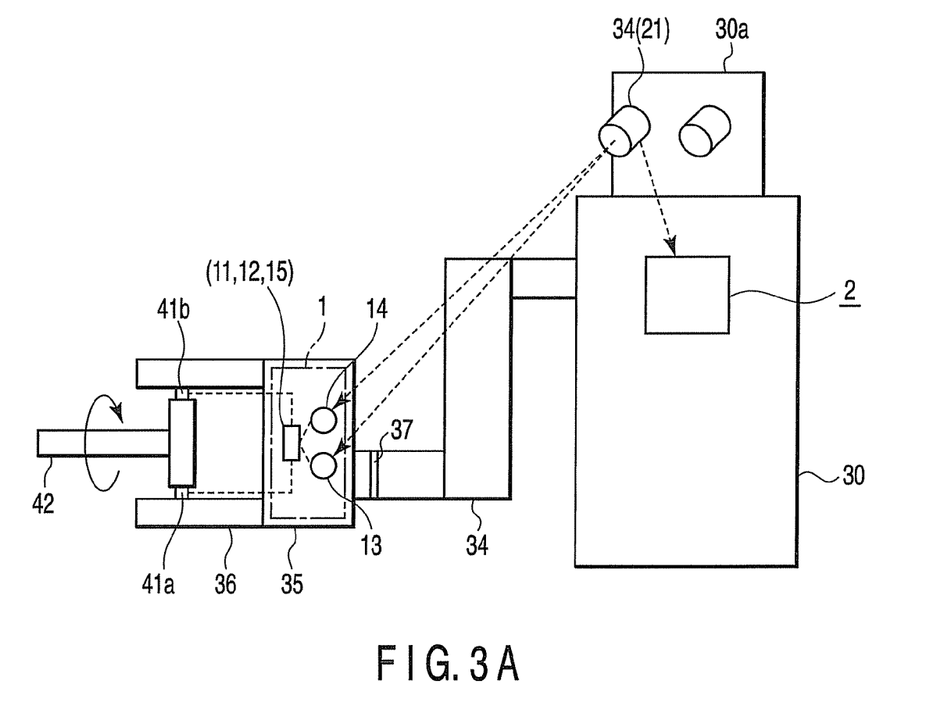
FIG. 3A is an exemplary views depicting examples in which information communication systems of second embodiments are mounted on robots having force sensors, respectively.
Figure 3B:
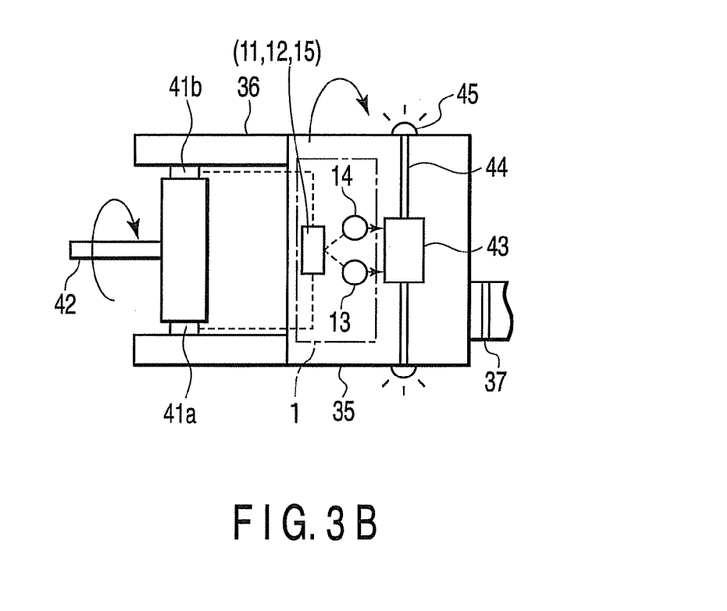
FIG. 3B is an exemplary views depicting examples in which information communication systems of second embodiments are mounted on robots having force sensors, respectively.

FIGS. 3A and 3B illustrates configuration examples of information communication systems used for robots conducting work such as opening/closing of a rotating valve regarding the second embodiment. The constituent parts shown in FIGS. 3A and 3B and equivalent to the constituent parts illustrated in FIG. 2 are designated with identical symbols and their explanations are omitted.

The work of the robots includes work to rotate the rotating valve and open/close it, and work to rotate a faucet of running water and open/close it. Operations involving such rotations can achieve by providing a rotating mechanism for the tip of the arm unit 34, etc, of the robot, or for a hand unit attached to the tip thereof is a possible approach. The robot 30 shown in FIG. 3A is configured in that the tip of the arm unit 34 is provided with a rotating mechanism 37 has a gear, etc., and the hand unit 35 attached to the rotating mechanism 37 is rotatable. The hand unit 35 depicted in FIG. 3B is provided with a plurality of gripping units 36 with bar-shapes functioning as fingers. In the gripping units 36, force sensors 41*a* and 41*b* are disposed at the spots at which handle parts are touched when the handle of a valve 42 is gripped. The force sensors 41*a* and 41*b* are connected to the signal processor 11 of the transmitting device 1. Like the first embodiment above mentioned, concerning the sensor signals detected by the force sensors 41*a* and 41*b*, the light flux with the color and the brightness based on the sensor signals are irradiates from the color LED 13 to the imaging unit 21. In rotating the handle, the gripping units 36 press the force sensors 41*a* and 41*b* to the handle. The control unit of the robot 30 determines the fully opened state of the valve 42 on the basis of reaction force measured by the force sensors 41*a* and 41*b* and applied to the gripping unit 36.

It is needed for both color LED 13 and the reference LED 14 disposed at such a hand unit 35 to irradiate the emitted light flux to the imaging unit 21 of the receiving device 2. Therefore, even when the hand unit 35 is rotated, the light emitting parts of the LEDs 13 and 14 should be entered within the imaging eyesight (within field angle range) of the imaging unit 21 at least when the work is terminated. Tow methods for achieving the configuration are possible approaches.

Firstly, as shown in FIG. 3A, the configuration is set so that the light emitting parts of the color LED 13 and the reference LED 14 are positioned within the field angle range of the imaging unit 21 when the hand unit 25 completes the valve opening/closing work to stop its rotation. That is, when the robot 30 conducts the work of closing the valve 42, it is important to confirm the end of the closing rather than the start thereof. Accordingly, if the frequency of the rotations of the handle from the full open to the full close (or full close to full open) of the valve 42 has already known, the configuration can be set depending on the prediction of the stop position of the hand unit 35. It is supposed that the valve 42 is configured to be fully opened from the fully closed state by two and a half rotations.

For instance, in the work start state, it is assumed that the valve is fully opened and the imaging unit 21 is arranged to image the beam of the light looking down from the upper point (just above) of the handle. For the work of fully closing the valve 42, the communication system obtains to store the relative level from the color LED 13 and the reference LED 14 before starting the work if necessary. At first, the robot 30 adjusts the direction of the hand unit 35 so as to the light emitting parts of the color and reference LEDs 13 and 14 positioned as the lower part (just below), and grips the handle to start the work. When the valve 42 is fully closed, the light emitting parts of the color and reference LEDs 13 and 14 stop at upward turns, and enable imaging the light flux irradiated within the field angle range of the imaging unit 21.

At this moment, the gripping unit 36 presses the force sensors 41a and 41b to the handle. When the color LED 13 enters the field angle range of the imaging unit 21 before completing the full closing work, the communication system can communicate the reaction force measured by the force sensors 41a and 41b and applied to the grasping unit 36, and can determine the fully closed state of the valve 42 by means of the determination of the control unit of the robot 30.

Secondly, a plurality of suites of the color LED 13 and the reference LED 14 are arranged surrounding the hand unit 35 so that the hand unit 35 rotates and the light emitting parts of the color and reference LEDs 13 and 14 enter the field angel range of the imaging unit 21 even if the hand unit 35 is stopped at any position. The imaging unit 21, for example, can image within the range of 120°, the light emitting parts of three suites of the color and reference LEDs 13 and 14 may be equally disposed at the exterior of the hand unit 35. In this example, a plurality of pieces of the color and reference LEDs 13 and 14 being needed, one suite of the color and reference LEDs 13 and 14 will achieve the imaging.

As illustrated in FIG. 3B, it is acceptable for a configuration to dispose the light emitting parts of the color and reference LEDs 13 and 14 inside the hand unit 35, arrange a distributing unit 43 distributing the light flux into a plural number in front of an irradiation direction, guide the distributed each light flux via optical fibers 44, respectively, and irradiate the light fluxes outside from light emitting windows 45 disposed at exterior surrounds of the hand unit 35.

In the second embodiment, the example in which the plurality of suites of LEDs or light emitting windows are disposed by setting the color LED 13 and the reference LED 14 as one suite having described, since the reference LED 14 is used to calculate the relative level, at least one suite thereof may be enough. In the embodiment, the rotating operation of the hand unit 35 having described as the example, the present invention may include a turning operation and a vibration operation other than it. Not only the operation of the hand unit 35 but also the rotating operation and the turning operation of the arm unit 34 operate similarly to solve the problem caused by the shielding of the light flux.

As mentioned above, according to the second embodiment, in addition to the effects of the foregoing first embodiment, even when the work rotating the hand unit 35 is conducted, the receiving device 2 receives the light fluxes irradiated from the color LED 13 and the reference LED 14 of the transmitting device 1 to receive the sensor signals. The exterior surround of the hand unit 35 may be provided with a plurality of color LEDs and reference LEDs, and even if the communication system is configured to have one suite of the color LED and the reference LED, setting the work start position, or having a function of distributing the light flux achieves the communication system.

In general, although measuring the positions and attitudes of the valve to rotate and of the rotation-enabled hand unit requires model registration, etc., the embodiment can acquire the position information at the position with the light emitting unit disposed thereat, so that the model registration becomes not always necessary and its trouble may be eliminated.

Next, a third embodiment of the invention will be set forth.

Figure 4:
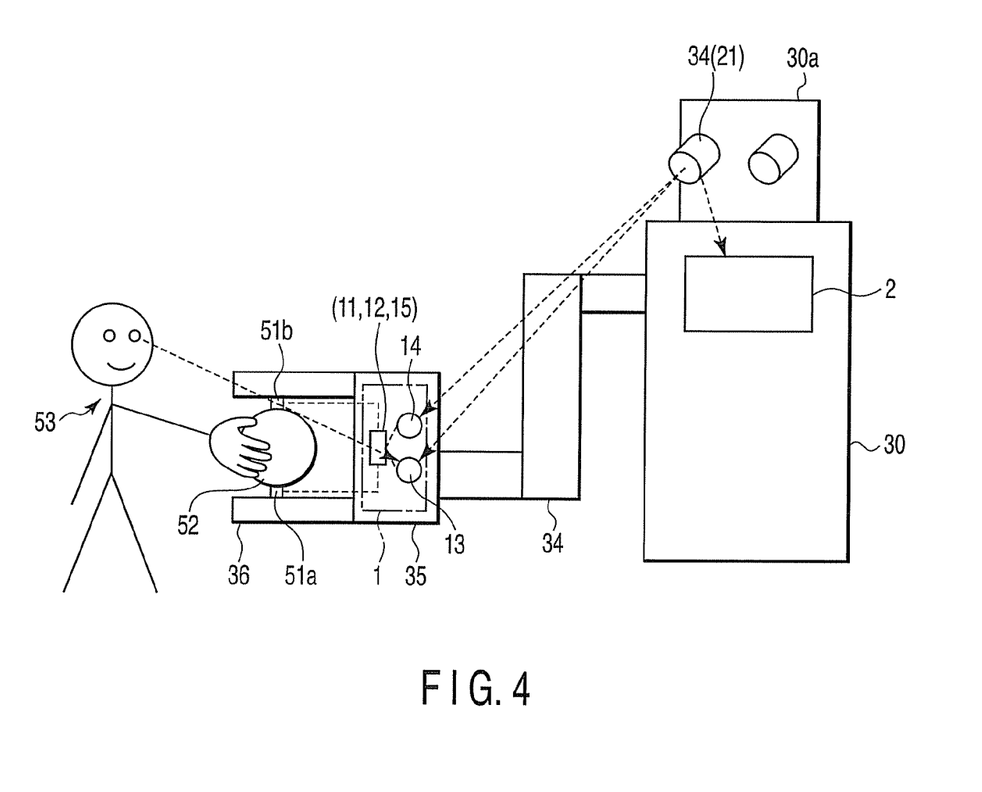
FIG. 4 is an exemplary view depicting an examples in which an information communication system of a third embodiment is mounted on a robot having a contact sensor.

The third embodiment is utilized for performing work related to each other between a robot and a user. For example, as shown in FIG. 4, in the work by which a user 53 transfers articles 52 to the hand unit 35 of the robot 30, after confirming whether or not the hand unit 35 has surely gripped the articles 52, the user 53 should take its hand off the articles 52. However, in general, the shape of the gripping unit 26 functioning like fingers is different from that of human being. Since the outer appearance of the gripping unit 36 does not vary, and it operates with no expression and reaction, it is hard for the user 53 to confirm the gripping state of the gripping unit 36.

In the communication system of the third embodiment, the user 53 determines the gripping completion stats of the contact sensors 51a and 51b disposed at the gripping unit 36 by means of the light emitting colors from the color LED 13 of the sensor signal transmitting device 1. For instance, a sensor signal indicating "on" (gripping completion) at a contact sensor 51a is set to a color LED irradiating as a light flux in red, and similarly, a sensor signal indicating "on" (gripping completion) at a contact sensor 51b is set to a color LED irradiating as a light flux in blue.

According to such setting, during the gripping operation of the gripping unit 36, the color LED 13 does not irradiate the light flux. Either of them, for instance, the "on" (gripping completion) of the contact sensor 51a making only the LED of red light emit light, the color LED 13 emits read light. After this, the "ON" (gripping completion) of the contact sensor 51b making the LED of blue light emit light, the red light and the blue light are mixed, and the color LED 13 emits purple light. Therefore, when the user 53 starts the gripping by the gripping unit 36, the light emitting part of the hand unit 35 does not emit light, it emits the red light or the blue light with becoming gripping state. Further, when the gripping unit 36 completely grips articles 52, the light emitting part of the hand unit 35 emits the purple light. The user 53 can determine the fact of the completion of the gripping of the articles 52 by the hand unit 35 of the robot 30 depending on the change in color of the light flux of the emitted light.

As mentioned above, according to the third embodiment, in addition to the effect obtained from the aforementioned first embodiment, the user can intuitively grasp the completion of the work instructed to the robot side on the basis of the changes in light emitting color at the color LED disposed at the hand unit being watched face by the user. In comparison to the configuration to convert the sensor signal into a sound, or to dispose a display unit on a robot main body side, the third embodiment can quickly observe the work status. In the third embodiment, the irradiation of the light flux from the color LED being a process used for the transmission of the sensor signal, and not being provided for visual recognition, any const does not occur.

Subsequently, a fourth embodiment will be described.

The fourth embodiment is an example in which an information communication system is mounted on a robot of which the plurality of types of hand units conducting different work are detachably mounted on a tip of an arm and the hand units can be replaced in response to use.

Figure 5:
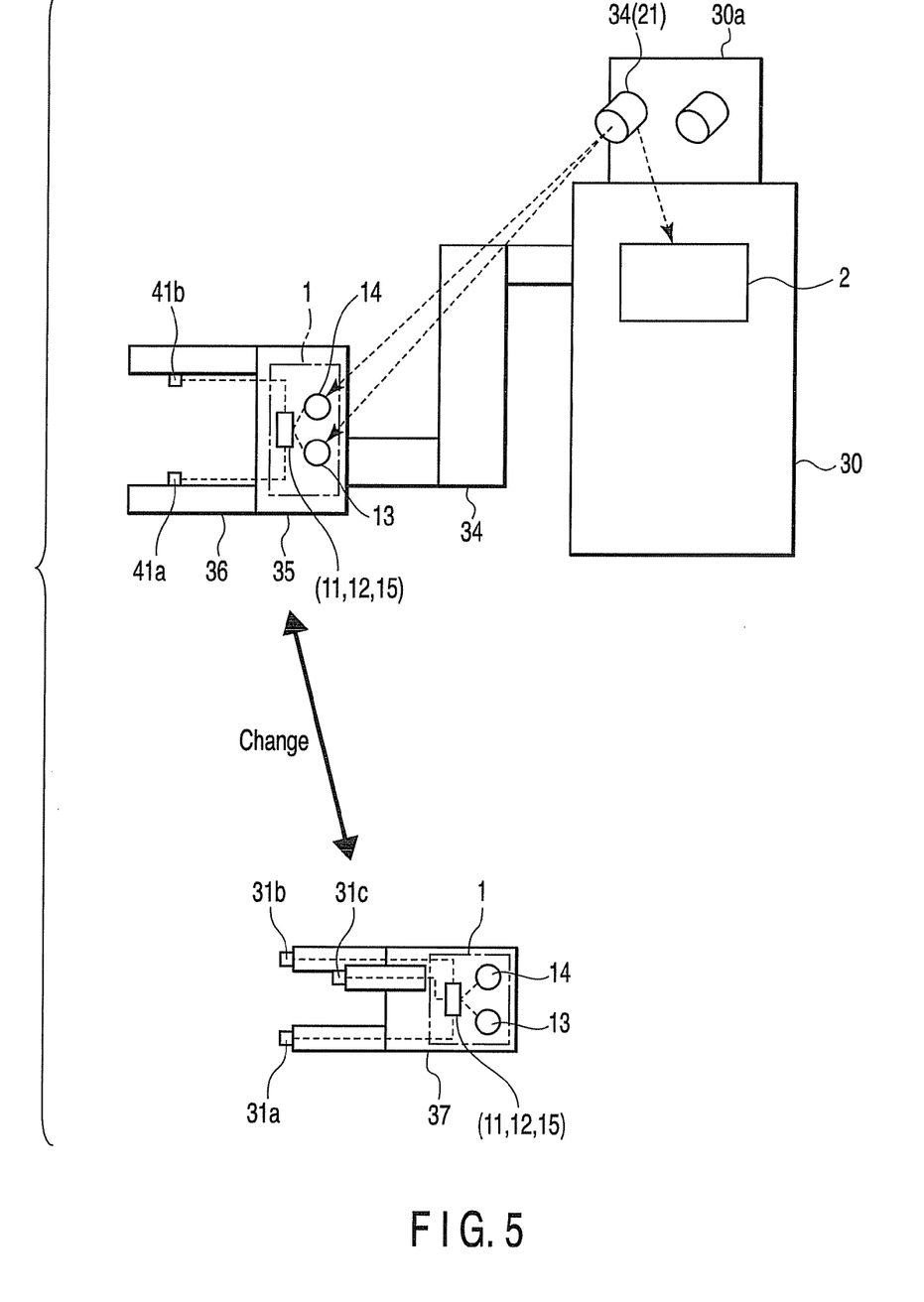
FIG. 5 is an exemplary view depicting an example in which an information communication system of a fourth embodiment is mounted on a robot having a displaceable hand unit.

As depicted in FIG. 5, the robot 30 is mounted with the hand unit 35 with the force sensor provided therewith. In the structure, similar to the robot structure in the second and third embodiments, the robot 30 operates by gripping the handle of the valve, and it grips the articles, etc., to transfer them to and from the user or among the robots with one another. In contrast, if a hand unit 37 with a plurality of distance sensors provided therewith, the robot grip the articles to transfer them.

As described above, according to the fourth embodiment, in addition to the effect obtained from the first embodiment, the information communication system can be easily applied to the robot having general versatility capable of selecting and replacing hand units having suitable functions in response to work. The communication system of the fourth embodiment has a sensor signal transmitting device and a sensor signal receiving device separately from each other, and makes optical communications between the devices, so that even if the hand units are replaced, the wiring work accompanied by replacement work is not necessary. The communication system then can correspond only by changing software-based setting items of the sensor signal receiving device. Of course, to achieve efficient work, a configuration of a specification, in which a program to change setting items of the hand units are recorded on a detachable recording medium, and the recording medium is mounted on a not shown input unit to be read out in replacing the hand units to automatically change the testing items is acceptable. In the fourth embodiment, having used an optical communication and not having used a radio communication, there is no need to set again the assignment of frequency bands resulting form the replacement of the hand units, and the replacement thereof is performed easily. Providing the connector which has been required for the signal line is not necessary, and the communication system can avoid producing the problem on the attenuation of the sensor signals.

According to the embodiments of the foregoing present invention, the information communication system which converts the information signals among the constituent parts of the robot to make communications and also used for the robot presenting the state thereof to the user, and the robot which carries the information communication system can be provided. The light emitting state from the light emitting unit using the operation state of the robot for communications allows the user to intuitively and quickly perceive the sensor signals.

According to the embodiments of the present invention, the sensor signal transmitting device and the sensor signal receiving device being separated from each other and the information being transmitted and received through the optical communications, there is no need to lay the wiring between the devices and any failure due to the disconnection of the wiring does not occur. The invention using the optical communications, the drawing of the wiring to the constituent parts of the robot connecting the transmitting device and the receiving device is omitted, and the constituent part having the movable unit and the joint make the configuration of the robot simple. Furthermore, in comparison to the radio communication, the place at which the robot operates, the number of the robots, etc., are not restricted. The invention is not limited to the configuration of the aforementioned each embodiment, in an implementation phase, this invention may be embodied in various forms without departing from the spirit or scope of the general inventive concept thereof. Various types of the invention can be forms by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

What is claimed is:

1. An information communication system for use in a robot which has a movable portion, comprising a transmitting device and a receiving device:

the transmitting device including:
at least one sensor provide at the movable portion, which generates a sensor signal;
a signal processing unit which converts brightness signal which corresponds to an output level of the sensor signal, and color signal used for identifying the sensor; and
a light emitting unit which emits an optical signal having the color signal and the brightness signal, respectively, and a reference optical signal, the receiving device including:
an imaging unit which images the optical signal and the reference optical signal emitted by the transmitting device;
an image processing unit which extracts the color signal and the brightness signal from image data generated by the imaging unit; and
an analyzing unit which analyzes the color signal and the brightness signal to output an information for identifying the sensor and the output level of the sensor signal.

2. The information communication system according to claim 1, wherein the light emitting unit includes:
a first light emitting subunit provided for the movable portion, located near the sensor, and having an exposed light emitting portion which emits the optical signal including at least one color type;
a second light emitting subunit provided for the movable portion, located adjacent to the first light emitting subunit, and emitting a reference light beam having predetermined color and brightness.

3. The system according to claim 2, wherein the optical signal emitted by the first light emitting subunit has at least one color type selected from the group consisting of: a transparent color; a single color; and a synthetic color of a number of colors.

4. The system according to claim 2, wherein before the transmitting device operates, the image processing unit calculates a relative level, used for eliminating adverse effects which an optical environment of the robot has on the optical signal, based on the optical signal and the reference optical signal, and corrects the image data generated by the imaging unit, based on the relative level.

5. The system according to claim 1, wherein a plurality of light emitting units, each of which is identical to the light emitting unit, are arranged near the sensor, such that at least one of the light emitting units is within a angle of view of the imaging unit when the movable portion is moved along with the sensor provided thereon.

6. The system according to claim 1, wherein the light emitting unit further includes:
a plurality of light emitting windows provided on the movable portion such that at least one of the light emitting windows is within an angle of view of the imaging unit when the movable portion is moved along with the sensor provided thereon;
a distributing unit which distributes the optical signal emitted from the light emitting unit; and
a light guide member which guides the optical signal distributed by the distributing unit to the light emitting windows.

7. The system according to claim 2, wherein the first light emitting subunit emits optical signals of at least one of three colors individually or simultaneously based on the sensor signal, thereby outputting a colored optical signal.

8. The system according to claim 7, wherein the first light emitting subunit emits optical signals successively or at predetermined intervals.

9. The system according to claim 1, wherein the imaging unit uses a robot imaging unit provided for the robot and functioning as an eye of the robot when the robot is operated.

10. The system according to claim 2, wherein the first light emitting subunit includes a plurality of light emitting portions that emit optical signals of different colors depending upon manners in which the movable portion is moved, and a change in the manners in which the movable portion is indicated by a change in the color of the optical signal.

11. The system according to claim 2, wherein the first light emitting subunit emits the optical signal at predetermined intervals, and different pieces of information are indicated by how many times the first light emitting subunit emits the optical signal within a unit time.

12. The system according to claim 2, wherein the first light emitting subunit emits the optical signal at predetermined intervals, and different pieces of information are indicated by how long the predetermined intervals.

* * * * *